(12) United States Patent
Schmidt et al.

(10) Patent No.: US 9,777,831 B2
(45) Date of Patent: Oct. 3, 2017

(54) METHOD FOR OPERATING AN AUTOMATIC TRANSMISSION

(71) Applicant: ZF Friedrichshafen AG, Friedrichshafen (DE)

(72) Inventors: Andreas Schmidt, Bavendorf (DE); Georg Mihatsch, Lindau (DE); Ruben Cueppers, Wangen (DE); Max Trautwein, Kressbronn (DE); Thorsten Schaetzle, Meersburg (DE)

(73) Assignee: ZF FRIEDRICHSHAFEN AG, FRIEDRICHSHAFEN (DE)

( * ) Notice: Subject to any disclaimer, the term of this patent is extended or adjusted under 35 U.S.C. 154(b) by 394 days.

(21) Appl. No.: 14/512,502

(22) Filed: Oct. 13, 2014

(65) Prior Publication Data

US 2016/0102753 A1   Apr. 14, 2016

(51) Int. Cl.
*F16H 61/04* (2006.01)
*F16H 61/686* (2006.01)

(52) U.S. Cl.
CPC ....... *F16H 61/0403* (2013.01); *F16H 61/686* (2013.01); *F16H 2061/0455* (2013.01); *F16H 2061/0474* (2013.01)

(58) Field of Classification Search
None
See application file for complete search history.

(56) References Cited

U.S. PATENT DOCUMENTS

| 5,261,288 A  * | 11/1993 | Menig ................. F16H 61/0248 |
| | | 74/335 |
| 8,206,257 B2 * | 6/2012 | Gumpoltsberger ..... F16H 3/663 |
| | | 475/277 |
| 8,500,601 B2 * | 8/2013 | Arnold ................ F16H 61/0403 |
| | | 475/303 |

* cited by examiner

*Primary Examiner* — Colby M Hansen
(74) *Attorney, Agent, or Firm* — Dority & Manning, P.A.

(57) ABSTRACT

A method for operating an automatic transmission is provided. The method includes initiating a synchronization of a positive shifting element of the automatic transmission while the automatic transmission is operating at less than a threshold output speed. The method also includes closing a first non-positive shifting element of the automatic transmission and positioning a second non-positive shifting element of the automatic transmission at an engaged configuration of the second non-positive shifting element during the synchronization of the first positive shifting element in order to synchronize the first positive shifting element.

20 Claims, 4 Drawing Sheets

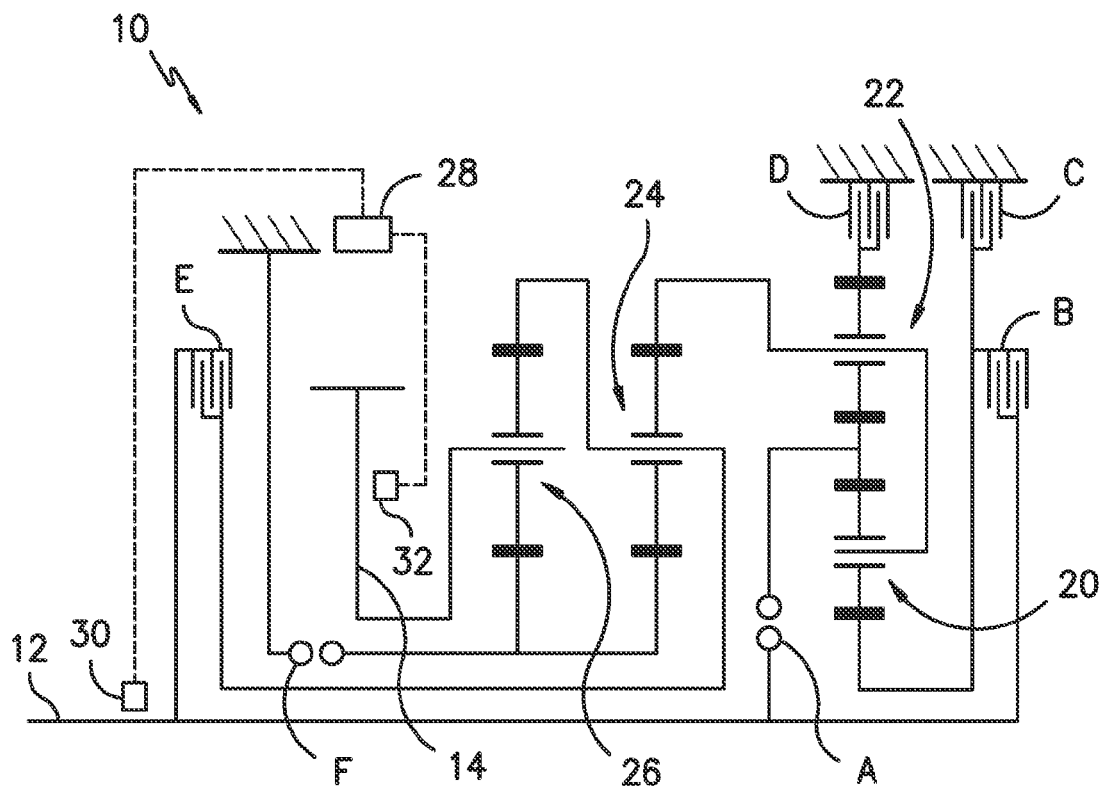
FIG. -1-
FIG. -2-

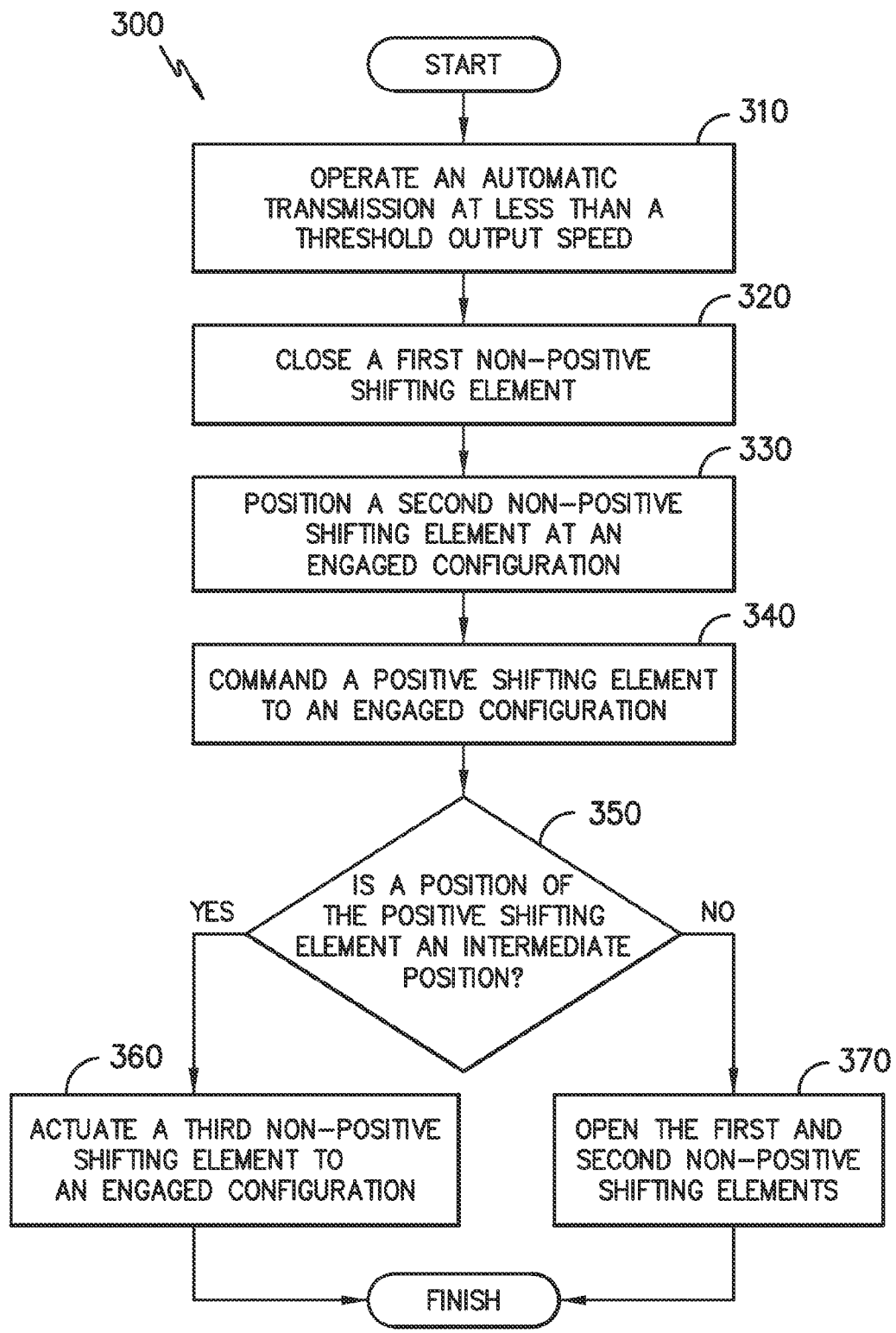
FIG. -3-

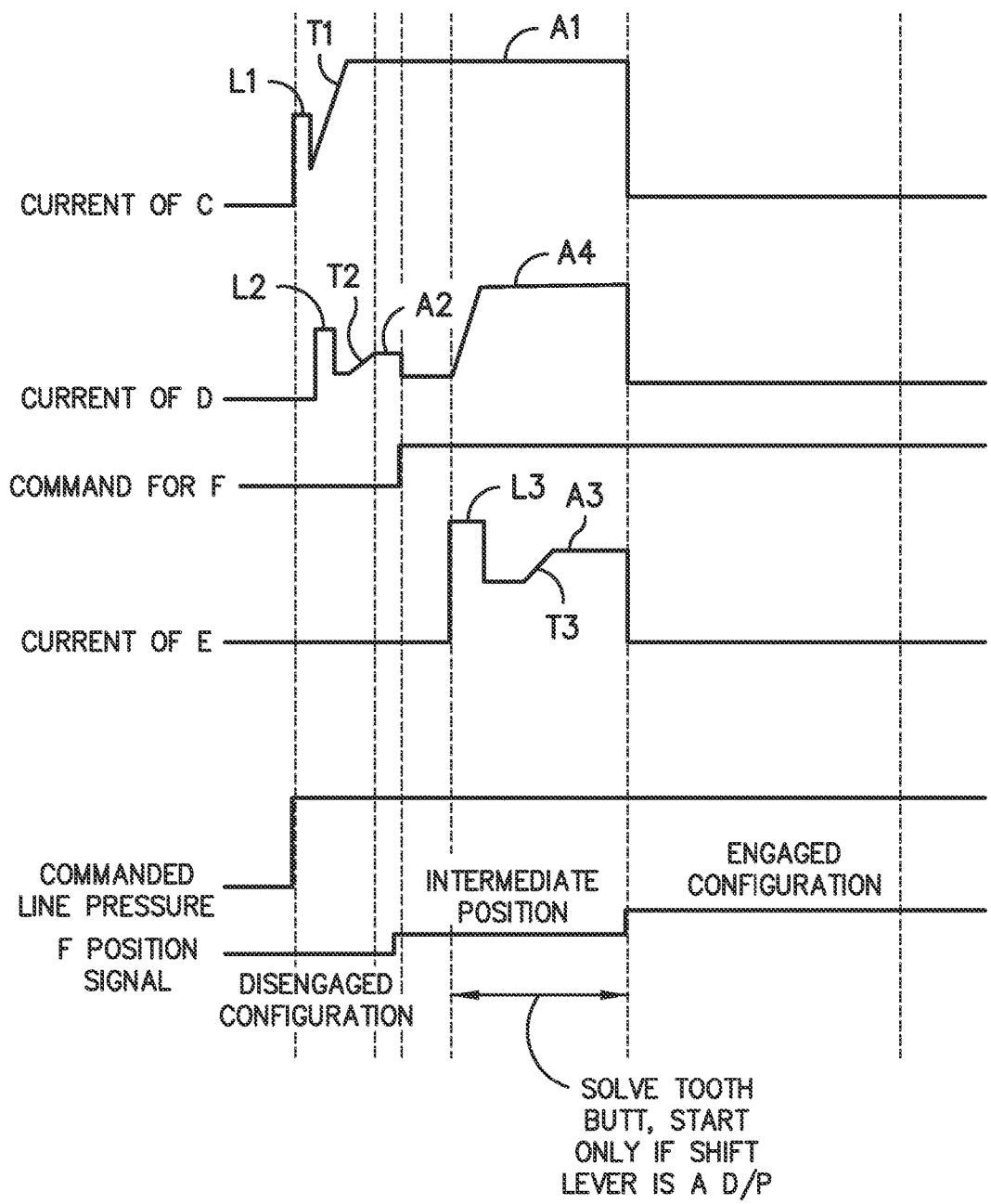
FIG. -4-

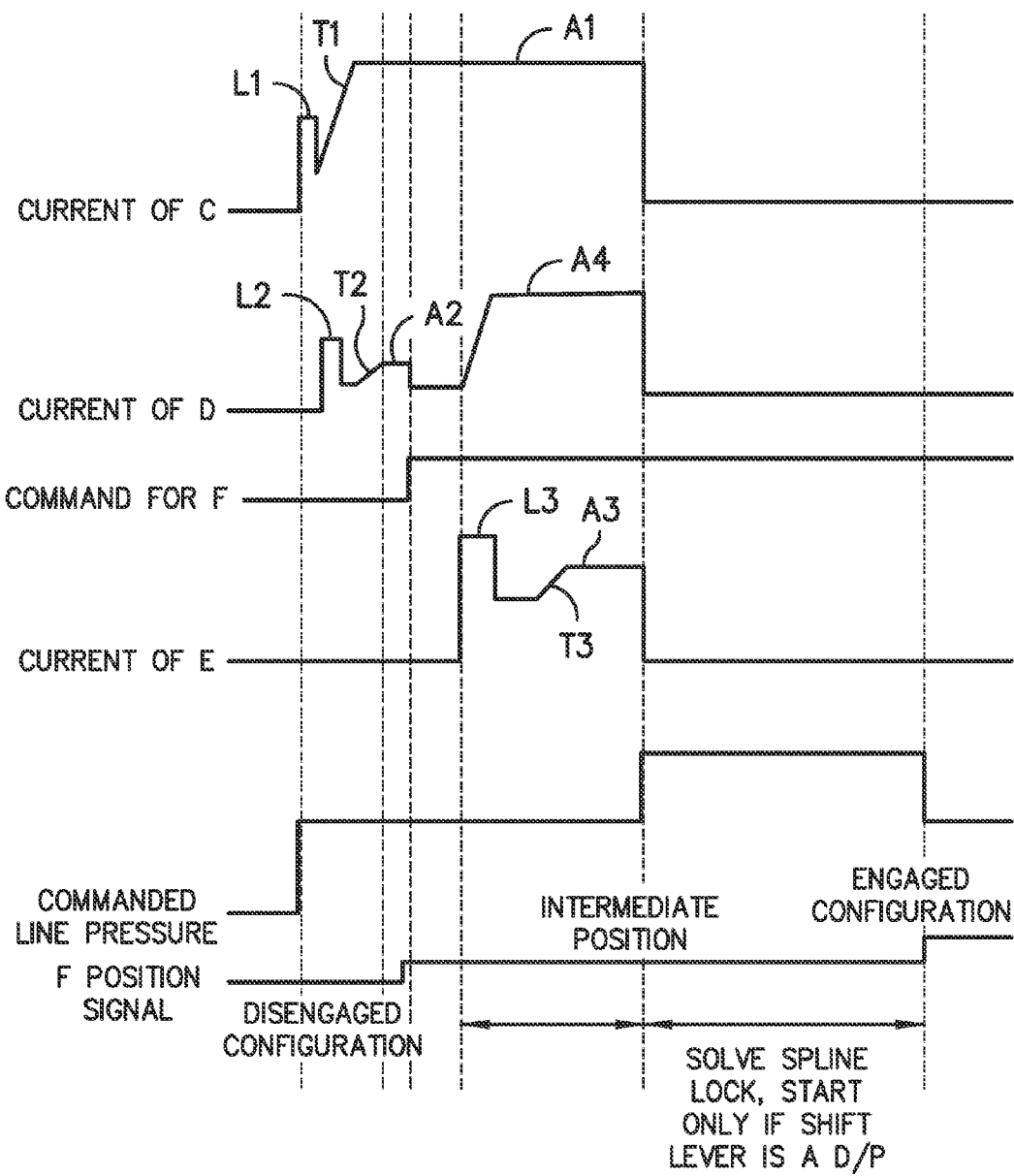
FIG. -5-

METHOD FOR OPERATING AN AUTOMATIC TRANSMISSION

FIELD OF THE INVENTION

The present subject matter relates generally to automatic transmissions, such as nine-speed automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Certain automatic transmissions include dog clutch shifting elements. During various gear shifts, the dog clutch is engaged or closed. Engaging the dog poses certain challenges. For example, the dog clutch is generally synchronized prior to engaging the dog clutch. When the dog clutch is synchronized, components of the dog clutch rotate at a common speed and may engage each other more easily. Conversely, such components may grind against each other and be damaged if the dog clutch is engaged while the dog clutch is not synchronized. However, synchronizing the dog clutch can be difficult and/or time consuming. For example, a separate synchronizing mechanism can consume valuable space within a transmission and add to an overall cost of the automatic transmission.

Certain conditions can also hinder or prevent actuation of the dog clutch. For example, even when the dog clutch is synchronized, teeth of the dog clutch can butt against one another and hinder or prevent engagement of the dog clutch. As another example, the teeth of the dog clutch can stick and hinder or prevent actuation of the dog clutch even when the dog clutch is synchronized.

Accordingly, a method for synchronizing a dog clutch of an automatic transmission would be useful. In particular, a method for synchronizing a dog clutch of an automatic transmission that also includes steps for ameliorating tooth butting and/or spline locking of the dog clutch would be useful.

BRIEF DESCRIPTION OF THE INVENTION

The present subject matter provides a method for operating an automatic transmission. The method includes initiating a synchronization of a positive shifting element of the automatic transmission. During the synchronization of the positive shifting element, a first non-positive shifting element of the automatic transmission is closed and a second non-positive shifting element of the automatic transmission is positioned at an engaged configuration of the second non-positive shifting in order to synchronize the first positive shifting element. Additional aspects and advantages of the invention will be set forth in part in the following description, or may be apparent from the description, or may be learned through practice of the invention.

In a first exemplary embodiment, a method for operating an automatic transmission is provided. The automatic transmission has a plurality of non-positive shifting elements and at least one positive shifting element. The method includes operating the automatic transmission at less than a threshold output speed, closing a first non-positive shifting element of the plurality of shifting elements, positioning a second non-positive shifting element of the plurality of shifting elements at an engaged configuration of the second non-positive shifting element, and commanding a first positive shifting element of the at least one positive shifting element to actuate from a disengaged configuration to an engaged configuration.

In a second exemplary embodiment, a method for operating a nine-speed automatic transmission is provided. The nine-speed automatic transmission includes a friction shifting element C, a friction shifting element D, a friction shifting element E, and a dog clutch F. The method includes initiating a synchronization of dog clutch F while the nine-speed automatic transmission is operating at less than a threshold output speed, closing the friction shifting element C during the synchronization of dog clutch F, positioning the friction shifting element D at an engaged configuration of the friction shifting element D during the synchronization of dog clutch F, commanding the dog clutch F to actuate to an engaged configuration during the synchronization of dog clutch F, determining a position of the dog clutch F after the step of commanding, and actuating the friction shifting element E if the dog clutch F is in an intermediate position at the step of determining.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of an automatic transmission according to an exemplary embodiment of the present subject matter.

FIG. 2 illustrates a table of an exemplary shifting scheme as may be used with the exemplary automatic transmission of FIG. 1.

FIG. 3 illustrates a method for operating an automatic transmission according to an exemplary embodiment of the present subject matter.

FIGS. 4 and 5 illustrate plots of shifting element actuation for the exemplary automatic transmission of FIG. 1 during the exemplary method of FIG. 3.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

FIG. 3 illustrates a method 300 for operating an automatic transmission according to an exemplary embodiment of the present subject matter. Method 300 may be used in or with any suitable transmission. For example, method 300 may be used with automatic transmission 10 (FIG. 1). The electronic control unit 28 of automatic transmission 10 may be programmed or configured to implement method 300. Utilizing method 300, a positive shifting element of automatic transmission 10, such as dog clutch F or dog clutch A, may be synchronized and engaged, e.g., when an associated vehicle is stopped or operating at slow speeds.

FIGS. 4 and 5 illustrate plots of shifting element actuation for automatic transmission 10 during method 300. FIG. 4 provides a plot of shifting element actuation, including actuation of dog clutch F, with teeth of dog clutch F butting against one another during the actuation process. FIG. 5 provides a plot of shifting element actuation, including actuation of dog clutch F, with teeth of dog clutch F locking against one another during the actuation process. Method 300 is described in greater detail below with reference to FIGS. 4 and 5.

In FIGS. 4 and 5, lines labeled "current of C", "current of D" and "current of E" correspond to a command current supplied to a respective solenoid valve of multidisc brake C, multidisc brake D and multidisc clutch E. Electronic control unit 28 may selectively adjust the current supplied to the respective solenoid valve of multidisc brake C, multidisc brake D and multidisc clutch E as shown in FIGS. 4 and 5. The line labeled "command for F" corresponds to a commanded position for dog clutch F, with the lower position corresponding to the disengaged configuration and the higher position corresponding to the engaged configuration. The line labeled "command line pressure" corresponds to a pressure supplied to dog clutch F. Electronic control unit 28 may selectively adjust the command line pressure to dog clutch F, e.g., by selectively opening and closing the solenoid valve of dog clutch F. The line "F position signal" corresponds to a measured or detected position for dog clutch F. In FIGS. 4 and 5, the illustrated command current supplied to the respective solenoid valve of multidisc brake C, multidisc brake D and multidisc clutch E may also correspond or correlate to the fluid pressure supplied to such shifting elements.

At step 310, automatic transmission 10 is operated such that an output speed of automatic transmission 10 is less than a threshold output speed. As an example, electronic control unit 28 may receive speed measurements of output shaft 14 from output speed sensor 32 to measure the output speed of automatic transmission 10 at step 310. The threshold output speed may be any suitable speed. For example, the threshold output speed may be zero rotations per minute, no greater than one thousand rotations per minute, no greater than five hundred rotations per minute, etc.

As discussed above, method 300 includes steps for synchronizing and engaging a positive shifting element of automatic transmission 10, such as dog clutch F or dog clutch A. In particular, method 300 includes steps for synchronizing and engaging a positive shifting element of automatic transmission 10, such as dog clutch F or dog clutch A, if the output speed of automatic transmission 10 is zero or less than the threshold output speed. For example, when a driver of an associated vehicle starts a vehicle, method 300 may assist with synchronizing and engaging dog clutch F in order to assist with shifting automatic transmission 10 into first gear or the reverse gear. Thus, after step 310, a synchronization of dog clutch F is initiated as may be seen in FIGS. 4 and 5. Dog clutch F may be open or disengaged prior to starting method 300, e.g., before step 310.

At step 320, a first friction shifting element of automatic transmission 10 is closed. For example, multidisc brake C may be closed at step 320, as may be seen in FIGS. 4 and 5. Electronic control unit 28 may open a solenoid valve of multidisc brake C in order to close multidisc brake C at step 320. In particular, as may be seen in FIGS. 4 and 5, electronic control unit 28 may first open the solenoid valve of multidisc brake C to a first position by pulsing the current supplied to multidisc brake C to a first level L1, e.g., in order to fill any void(s) within a line to multidisc brake C with fluid. Electronic control unit 28 may then decrease the current supplied to the solenoid valve of multidisc brake C and increase the current supplied to the solenoid valve of multidisc brake C along a first actuating trajectory T1 until the current supplied to the solenoid valve of multidisc brake C reaches an actuation value A1 and the multidisc brake C is in the actuated configuration. In such a manner, multidisc brake C may be closed at step 320.

At step 330, a second friction shifting element of automatic transmission 10 is brought to an engaged configuration of the second friction shifting element. For example, multidisc brake D may be brought to an engaged configuration of multidisc brake D at step 330, as may be seen in FIGS. 4 and 5. Electronic control unit 28 may open a solenoid valve of multidisc brake D in order to bring multidisc brake D to its engaged configuration at step 330. In particular, as may be seen in FIGS. 4 and 5, electronic control unit 28 may first open the solenoid valve of multidisc brake D to a first position by pulsing the current supplied to multidisc brake D to a second level L2, e.g., in order to fill any void(s) within a line to multidisc brake D with fluid. Electronic control unit 28 may then decrease the current supplied to the solenoid valve of multidisc brake D and increase the current supplied to the solenoid valve of multidisc brake D along a second actuating trajectory T2 until the current supplied to the solenoid valve of multidisc brake D reaches an engaging value A2 and the multidisc brake D is positioned at the engaged configuration of multidisc brake D. In such a manner, multidisc brake D may be brought to the engaged configuration of multidisc brake D at step 330.

Steps 320 and 330 may assist with reducing a speed differential between rotating components of the positive shifting element of automatic transmission 10. For example, steps 320 and 330 may assist with reducing a speed differential between rotating components of dog clutch F. Thus, steps 320 and 330 may assist with synchronizing dog clutch F in order to assist with actuating dog clutch F from the disengaged configuration to the engaged configuration. In particular, by closing multidisc brake C and bringing multidisc brake D to its engaged configuration, dog clutch F may be synchronized and actuated to the engaged configuration. As may be seen in FIGS. 4 and 5, step 330 may begin after step 320. However, at least a portion of step 320 may be performed during or simultaneously with step 330.

At step 340, a positive shifting element of automatic transmission 10 is commanded to close or actuate to the engaged configuration. As an example, dog clutch F may be commanded to actuate to from the disengaged configuration to the engaged configuration at step 340, e.g., after dog clutch F is synchronized during steps 320 and 330. In particular, electronic control unit 28 may open a solenoid valve of dog clutch F such that a command line pressure supplied to dog clutch F is increased in order to command dog clutch F to adjust to the engaged configuration at step 340, as shown in FIGS. 4 and 5.

At step 350, a position of the positive shifting element of automatic transmission 10 is determined or established. Electronic control unit 28 may determine the position of dog clutch F at step 350. Any suitable method or mechanism may be used to determine or establish that position of dog clutch F at step 350. As an example, electronic control unit 28 may utilize the method described in U.S. Pat. No. 8,812,200 of Novak, which is hereby incorporated by reference for all purposes, to determine the position of dog clutch F at step 350. As another example, electronic control unit 28 may utilize a pressure difference across an actuating piston of the dog clutch F to determine the position of the position of dog clutch F at step 350, as will be understood by those skilled in the art.

If the position of the positive shifting element is in an intermediate position at step 350, a third non-positive shifting element of automatic transmission 10 is actuated, e.g., to a touch point of the third friction shifting element, at step 360. For example, multidisc clutch E may be actuated at step 360, as may be seen in FIGS. 4 and 5. Electronic control unit 28 may open a solenoid valve of multidisc clutch E in order to bring multidisc clutch E to the touch point of multidisc clutch E at step 360. In particular, as may be seen in FIGS. 4 and 5, electronic control unit 28 may first open the solenoid valve of multidisc clutch E to a first position by pulsing the current supplied to multidisc clutch E to a third level L3, e.g., in order to fill any void(s) within a line to multidisc clutch E with fluid. Electronic control unit 28 may then decrease the current supplied to the solenoid valve of multidisc clutch E and increase the current supplied to the solenoid valve of multidisc clutch E along a third actuating trajectory T3, e.g., until the current supplied to the solenoid valve of multidisc clutch E reaches a touching value A3 and the multidisc clutch E is positioned at the touch point of multidisc clutch E. In such a manner, multidisc clutch E may be actuated at step 360. Step 360 may be initiated or started if a shift lever of the associated vehicle is in a drive position or a park position. Conversely, step 360 may be deferred until the shift lever is in the drive position or the park position if the shift lever is in a neutral position, e.g., at step 340. In addition to actuating multidisc clutch E, multidisc brake D may also be closed at step 360, e.g., by increasing the current supplied to the solenoid valve of multidisc brake D to the actuation value A4, as shown in FIGS. 4 and 5.

During step 360, a rotational speed deferential between torque couplings of dog clutch F may decrease. Thus, if teeth of dog clutch F are butting against one another and dog clutch F is stuck in the intermediate position, the rotational speed deferential between torque couplings of dog clutch F may be decreased at step 360 in order to eliminate the tooth butt condition of dog clutch F. As shown in FIG. 4, dog clutch F may be actuated from the intermediate position to the engaged configuration when the tooth butt condition of dog clutch F is eliminated at step 360. With dog clutch F synchronized and in the engaged configuration, multidisc brake C, multidisc brake D and multidisc clutch E may be opened to the disengaged configuration, as shown in FIGS. 4 and 5.

If the position of the positive shifting element is in not the intermediate position at step 350, dog clutch F is in the engaged configuration. Thus, multidisc brake C and multidisc brake D may be opened at step 370, e.g., by reducing current supplied to solenoid valves of multidisc brake C and multidisc brake D to. In addition, automatic transmission 10 may be shifted to first gear or the reverse gear with dog clutch F in the engaged configuration after step 370.

Turning now to FIG. 5, method 300 may also include establishing the position of dog clutch F after step 360. If the position of the positive shifting element is still the intermediate position, a command line pressure supplied to dog clutch F may be increased, as shown in FIG. 5. For example, electronic control unit 28 may open the solenoid valve of dog clutch F in order to increase the command line pressure supplied to dog clutch F. If decreasing the rotational speed deferential between torque couplings of dog clutch F at step 360 does not permit or result in dog clutch F shifting to the engaged configuration, teeth of dog clutch F may be sticking. By increasing the command line pressure supplied to dog clutch F, the sticking may be overcome and dog clutch F may shift to the engaged configuration. In such a manner, spline lock of dog clutch F may be eliminated or overcome. As may be seen in FIG. 5, increasing the command line pressure to dog clutch F may be deferred until the shift lever is in the drive position or the park position.

It should be understood that while described in the context of automatic transmission 10, method 300 may be used to synchronize and engage a positive shifting element in any suitable transmission. In addition, while described in the context of synchronizing and engaging dog clutch F, method 300 may be used to detect synchronize and engage dog clutch A of automatic transmission 10, in alternative exemplary embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an automatic transmission, the automatic transmission having a plurality of non-positive shifting elements and at least one positive shifting element, the method comprising:
    operating the automatic transmission at less than a threshold output speed;
    closing a first non-positive shifting element of the plurality of shifting elements during said step of operating;
    positioning a second non-positive shifting element of the plurality of shifting elements at an engaged configuration of the second non-positive shifting element, said step of positioning initiated after said step of closing is started; and
    commanding a first positive shifting element of the at least one positive shifting element to actuate from a disengaged configuration to an engaged configuration after said step of positioning.

2. The method of claim 1, wherein said step of commanding comprises commanding the first positive shifting element to actuate from the disengaged configuration to the engaged configuration if a shift lever is in a drive position or a park position.

3. The method of claim 2, further comprising deferring said step of commanding until the shift lever is in the drive position or the park position if the shift lever is in a neutral position at said step of positioning.

4. The method of claim 1, wherein at least a portion of said step of closing is performed during said step of positioning.

5. The method of claim 4, wherein said step of positioning begins after said step of closing.

6. The method of claim 1, wherein a rotation speed deferential between torque couplings of the first positive shifting element decreases during said step of actuating.

7. The method of claim 1, further comprising:
    determining a position of the first positive shifting element after said step of commanding; and
    actuating a third non-positive shifting element of the plurality of shifting elements if the first positive shifting element is in an intermediate position at said step of determining.

8. The method of claim 7, further comprising:
    establishing the position of the first positive shifting element after said step of actuating; and
    increasing a command pressure to the first positive shifting element if the first positive shifting element is in the intermediate position at said step of establishing.

9. The method of claim 1, further comprising opening the first and second non-positive shifting elements of the plurality of shifting elements after said step of actuating.

10. The method of claim 1, wherein the threshold output speed is no greater than one thousand rotations per minute.

11. A method for operating a nine-speed automatic transmission, the nine-speed automatic transmission including a friction shifting element C, a friction shifting element D, a friction shifting element E, and a dog clutch F, the method comprising:
    initiating a synchronization of dog clutch F while the nine-speed automatic transmission is operating at less than a threshold output speed;
    closing the friction shifting element C during the synchronization of dog clutch F;
    positioning the friction shifting element D at an engaged configuration of the friction shifting element D during the synchronization of dog clutch F; and
    commanding the dog clutch F to actuate to an engaged configuration during the synchronization of dog clutch F.

12. The method of claim 11, wherein said step of commanding comprises commanding the positive shifting element C to actuate from the disengaged configuration to the engaged configuration if a shift lever is in a drive position or a park position during the synchronization of dog clutch F.

13. The method of claim 12, further comprising deferring said step of commanding until the shift lever is in the drive position or the park position if the shift lever is in a neutral position at said step of positioning.

14. The method of claim 11, wherein at least a portion of said step of closing is performed during said step of positioning.

15. The method of claim 14, wherein said step of positioning begins after said step of closing.

16. The method of claim 11, wherein a rotational speed deferential between torque couplings of the dog clutch F decreases during said step of actuating.

17. The method of claim 11, further comprising:
    determining a position of the dog clutch F after said step of commanding; and
    actuating the friction shifting element E if the dog clutch F is in an intermediate position at said step of determining.

18. The method of claim 17, further comprising:
    establishing the position of the dog clutch F after said step of actuating; and
    increasing a command pressure to the dog clutch F if the dog clutch F is in the intermediate position at said step of establishing.

19. The method of claim 11, further comprising opening the friction shifting element C and the friction shifting element D after said step of actuating.

20. The method of claim 11, wherein the threshold output speed is no greater than one thousand rotations per minute.

* * * * *